March 25, 1958     J. B. AMES     2,827,939
CONTAINER FOR FOOD PRODUCTS
Filed July 13, 1955
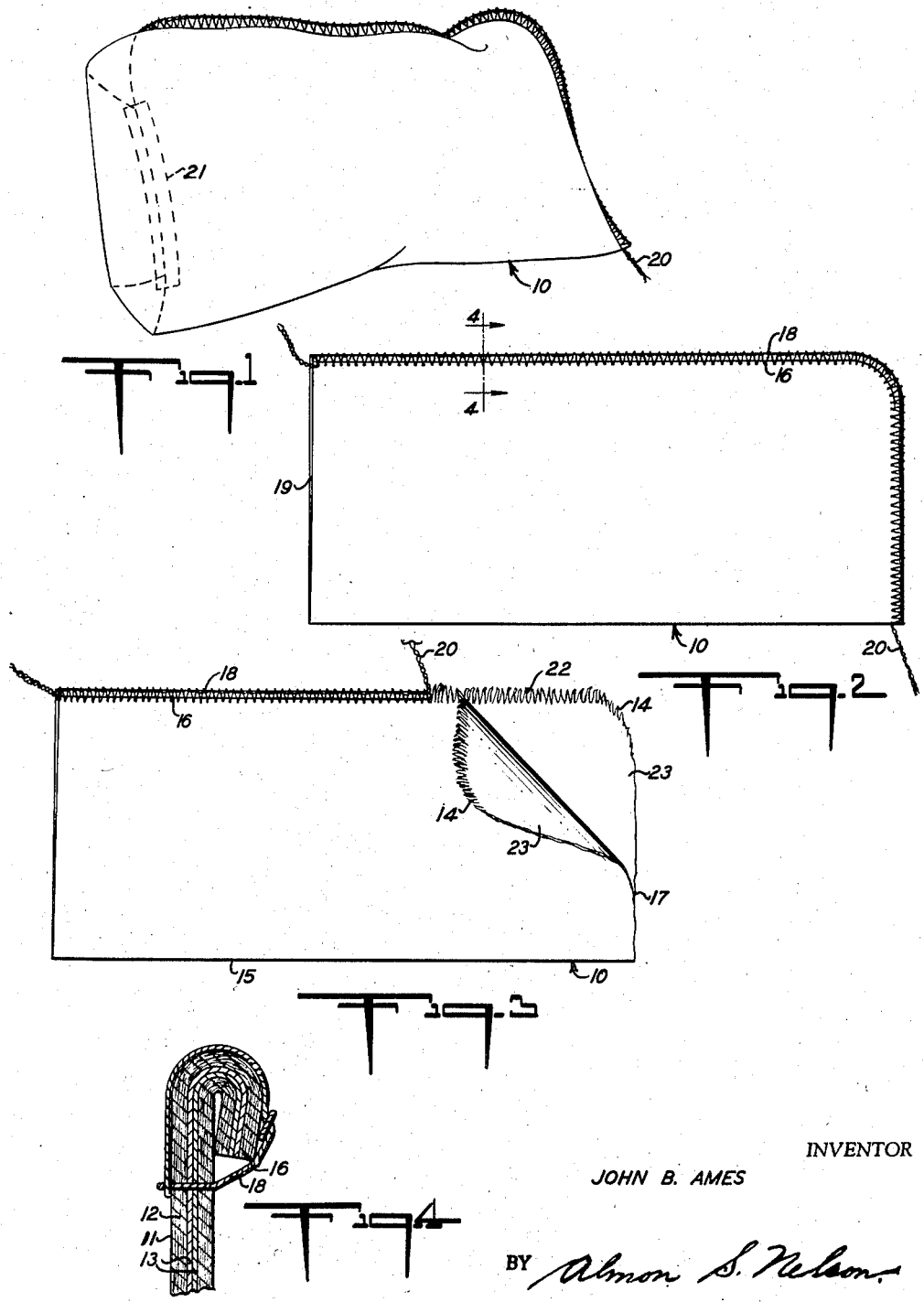
INVENTOR
JOHN B. AMES
BY Almon S. Nelson
ATTORNEY

United States Patent Office 2,827,939
Patented Mar. 25, 1958

2,827,939

CONTAINER FOR FOOD PRODUCTS

John B. Ames, Selma, Ala.

Application July 13, 1955, Serial No. 521,794

2 Claims. (Cl. 150—1)

This invention relates to packaging and more particularly to a disposable container for food products, such as sausage meat and the like, which container may be conveniently opened to expose the contents and in which the contents, when chilled, will not adhere to the material of the container.

For many years, food products, such as sausage meat, have been packaged in woven cotton bags having a paper liner or in cellophane bags. Both of these packages have the disadvantage that, when the sausage meat is chilled, the same sticks or adheres to the paper liner, in the case of the cotton bag and to the cellophane. As a result, when removing the sausage meat from the package, it is necessary to scrape the inside of the bag in order to remove all of the meat contained therein. Furthermore, in the case of cellophane, once the package is opened it is very difficult to utilize only a portion of the meat and thereafter adequately cover the same to provide sufficient protection and as a consequence, it has been necessary to remove all of the meat from the cellophane bag and protect the same in some way, such as wrapping the meat in another piece of cellophane or placing the same in a covered dish or the like.

While the cotton bag having a paper liner may be conveniently utilized to remove a portion of the meat by peeling the bag down, the meat must be scraped from the paper liner and also such woven cotton bags are relatively costly and materially increase the cost of the product. As a result, much time and effort has been spent in an attempt to develop a container for food products, such as sausage meat, which will have the desirable qualities of the woven cotton bag with a paper liner therein, but in which the meat will not adhere to such liner and also, at a cost commensurate with the cost of cellophane containers. Prior to the present invention, this research has not been too successful, and it is also to be noted that cellophane and other transparent films which have been utilized as food packages have not been particularly successful for packages weighing over one pound, since the strength of such films is insufficient to adequately contain a product of greater weight.

It is, accordingly, an object of this invention to provide a container for food products, such as sausage meat, which may be conveniently and economically manufactured from readily available materials and in which such meat, when chilled, will not adhere to the interior surface of the container.

A further object of the invention is the provision of a container for food products, such as sausage meat, which container may be conveniently opened and peeled away from the meat in order to expose a portion of the contents of the container and in which the material of the container may be utilized to cover the unused portion of the meat to provide adequate protection therefor.

A still further object of the invention is the provision of a container for food products, such as sausage meat, in which a fibrous non-woven material is utilized which permits convenient opening of the package in a novel manner and which also provides sufficient strength to provide packages weighing more than one pound.

A further object of the invention is the provision of a container for food products, such as sausage meat or the like, which possesses the desirable characteristics of a woven cotton bag and which, at the same time, may be manufactured at a cost approximating the cost of a cellophane or other transparent film bag thereby providing a container which may be sold in a highly competitive market and which will not materially increase the cost of the product packaged therein.

A still further object of the invention is the provision of a container for food products, which container may be formed from a substantially square blank of material which is folded and the juxtaposed edges secured together by a double chain stitch and in which such stitch provides a rip cord for conveniently opening the container, either in its entirety or for any desired portion thereof.

Further objects and advantages of the invention will be apparent from the following description taken in conjunction with the accompanying drawing wherein:

Fig. 1 is a view in perspective showing a container constructed in accordance with this invention and filled with a food product, such as sausage meat or the like;

Fig. 2 is a side elevational view of a container constructed in accordance with this invention prior to insertion of the food product therein;

Fig. 3 is a side elevational view of a container constructed in accordance with this invention and showing the manner of opening such container over a portion of the length thereof; and Fig. 4 is a sectional view to an enlarged scale taken substantially on the line 4—4 of Fig. 2, and showing the structure of the container at the edges thereof.

With continued reference to the drawing there is shown a container 10 formed from a sheet of material 11, which sheet may be formed from non-woven cotton, rayon or other fibers. As shown in Fig. 4, these fibers 12 are arranged in substantially parallel relationship and are disposed at substantially right angles to the longitudinal axis of the container. This arrangement of the fibers provides sufficient strength and, at the same time, materially contributes to the ease of opening the container as will appear from the following description. The fibers 12, however, may, if desired, be arranged haphazardly, but it has been found that the opening characteristics of the container are not as satisfactory with this arrangement, as when the fibers are arranged, as described above.

The sheet of fibrous material 11 is provided on one side with a coating 13 of polyethylene which acts as a liner and although other materials, such as cellophane, Saran, Pliofilm, may be utilized, it has been found that polyethylene is the most satisfactory from a cost and strength standpoint, as well as, and in view of, the fact that food products, such as sausage meat, will not adhere to this coating when the meat is chilled.

In making the container of this invention, the sheet 11 of fibrous material with the coating 13 applied thereto is provided as a substantially square blank with the corners 14, at one end of the blank being curved, and the blank is thereafter folded along a line 15 with the free edges 16, the curved edges 14 and the end edges 17 juxtaposed. These juxtaposed edges are then folded together in overlapping relationship, as clearly shown in Fig. 4, and are secured together by a double chain stitch 18. It is to be noted, that the chain stitch 18 is continuous and extends from the open end 19 of the container 10 along the side edge 16, around the curved edge 14 and across the end 17 of the container 10 to close the same. Also the threads forming the double chain stitch 18 extend from the closed end 17 of the bag 10, and provide a rip cord 20.

The container 10 may be filled with a food product, such as sausage meat, through the open end 19 and such open end thereafter closed in any desired manner, such as sealing the same with a tape 21 provided with a suitable adhesive. When it is desired to utilize the contents of the container 10, the same may be opened by pulling the rip cord 20, at which time, the end 17 of the container will be torn off along the line of stitching, as shown in Fig. 3, and this tearing operation is facilitated by the parallel arrangement of the fibers 12 in the sheet of material and continued pulling of the rip cord will result in tearing the stitches out of the material along the side 16, as shown at 22 in Fig. 3. The container 10 may be opened to any desired extent and the contents utilized, after which the flaps 23 formed by pulling the rip cord 20, may be folded over the remaining contents to cover and protect the same. Since the contents, such as sausage meat, does not adhere to the polyethylene liner 13, the contents may be conveniently removed from the container 10 without waste and since opening of the container, does not, in any way, destroy the same, the remaining contents may be adequately covered and protected, as described above.

It will be obvious that by the above described invention, there has been provided a container for food products, such as sausage meat, which may be economically manufactured from non-woven fibrous material and in which such container will adequately protect the food product and, at the same time, permit convenient access thereto, and furthermore, the liner provided in the container of this invention is of such a character that sausage meat and other food products will not stick or adhere thereto. The materials utilized in the container are of sufficient strength to permit the fabrication of containers for food products weighing up to several pounds and adequate protection at a minimum cost is provided.

It will be obvious to those skilled in the art that various changes may be made in the invention without departing from the spirit and scope thereof and therefore the invention is not limited by that which is shown in the drawing and described in the specification, but only as indicated in the appended claims.

What is claimed is:

1. A container for a food product comprising an elongated bag formed from a substantially square blank of non-woven fibrous material, a coating of polyethylene on one side of said blank providing a lining, the corners at one end of said blank being curved, said blank being folded with the free edges thereof juxtaposed, said edges along one side, around said curved corners and along the adjacent end being folded together in overlapping relationship, said folded edges being secured together by a continuous double chain stitch to provide a bag, which is open at one end and closed at the other, the threads forming said stitch extending across the closed end and along one side of said bag to provide a rip cord and the fibers in said material being substantially parallel and disposed at substantially right angles to the longitudinal axis of said bag whereby said bag may be filled with said food product after which the open end may be closed and upon pulling said cord the first mentioned closed end will be torn off along the line of stitching and upon continued pulling of said cord the stitches along the stitched side will be torn out of said material thereby opening said bag across one end and along the stitched side to expose said food product.

2. A container for a food product comprising an elongated bag formed from a substantially square blank of non-woven fibrous material, a coating of resilient plastic on one side of said blank providing a lining, the corners at one end of said blank being curved, said blank being folded with the free edges thereof being juxtaposed, said edges along one side, around said curved corners and along the adjacent end being folded together in overlapping relationship, said folded edges being secured together by a continuous double chain stitch to provide a bag which is open at one end and closed at the other, the threads forming said stitch extending across the closed end and along one side of said bag to provide a rip cord and the fibers in said material being substantially parallel and disposed at substantially right angles to the longitudinal axis of said bag whereby said bag may be filled with said food product after which the open end may be closed and upon pulling said cord the first mentioned closed end will be torn off along the line of stitching and upon continued pulling of said cord the stitches along the stitched side will be torn out of said material thereby opening said bag across one end and along the stitched side to expose said food product.

References Cited in the file of this patent

UNITED STATES PATENTS

| | | |
|---|---|---|
| 1,012,797 | Bates | Dec. 26, 1911 |
| 1,164,451 | Bates | Dec. 14, 1915 |
| 1,749,734 | Kelly | Mar. 4, 1930 |
| 2,178,611 | Scheidegger | Nov. 7, 1939 |
| 2,255,845 | Goldwyn | Sept. 16, 1941 |
| 2,534,473 | Peek | Dec. 19, 1950 |
| 2,631,630 | Brady et al. | Mar. 17, 1953 |
| 2,781,551 | Richerod | Feb. 19, 1957 |